Sept. 4, 1923.

H. W. DUNBAR 1,466,893

ELECTRICALLY DRIVEN GRINDING MACHINE

Filed Oct. 21, 1920

Witnesses
Harold W. Eaton
J. Calvin Bright

Inventor
Howard W. Dunbar
By Clyton L. Jenks
Attorney

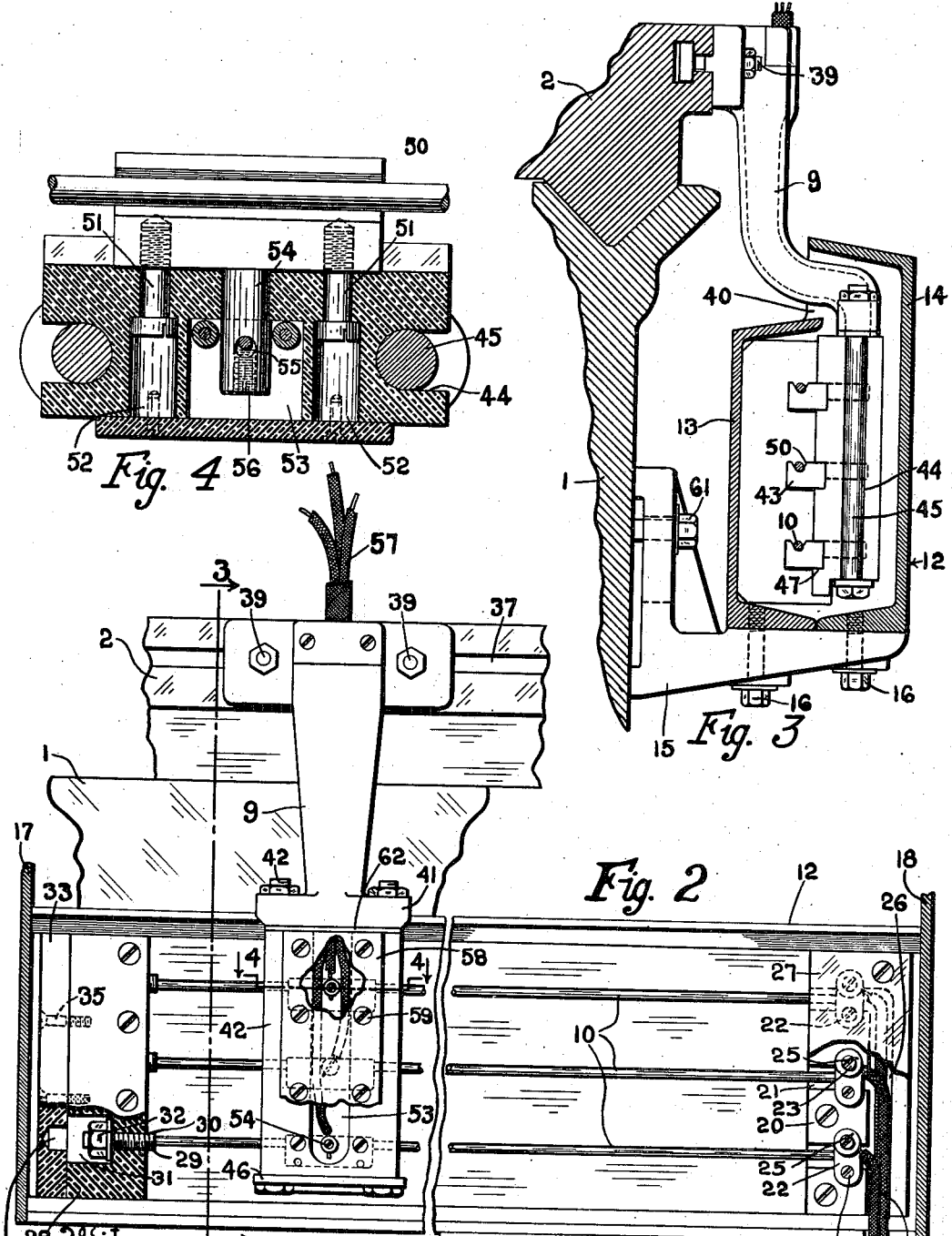

Patented Sept. 4, 1923.

1,466,893

UNITED STATES PATENT OFFICE.

HOWARD W. DUNBAR, OF WORCESTER, MASSACHUSETTS, ASSIGNOR TO NORTON COMPANY, OF WORCESTER, MASSACHUSETTS, A CORPORATION OF MASSACHUSETTS.

ELECTRICALLY-DRIVEN GRINDING MACHINE.

Application filed October 21, 1920. Serial No. 418,509.

*To all whom it may concern:*

Be it known that I, HOWARD W. DUNBAR, a citizen of the United States of America, residing at Worcester, in the county of Worcester and State of Massachusetts, have invented certain new and useful Improvements in Electrically-Driven Grinding Machines, of which the following is a full, clear, and exact specification.

This invention relates to machine tools, such as grinding machines, and more particularly to machines of this nature having a reciprocating table carrying devices, such as motors, which are adapted to be electrically energized.

In a grinding machine of large size it is often desirable and advantageous to have the work head driven by an electric motor carried on the headstock so that the motor follows the reciprocating movement of the work table, if the latter reciprocates, as in the Norton type of grinding machine. Because of this movement of the motor it is necessary to provide a flexible connection to convey current thereto and still control the same from the operator's position. It has heretofore been proposed to provide a length of flexible cable for this purpose between the motor and the base of the machine on which is located the operator's control switch. In order to prevent this cable from being fouled and worn by being dragged back and forth with the reciprocation of the table, it has in some instances been extended upwardly from the base through a hollow pillar and from the top of the pillar through a flexible protective hose pipe to the motor. This pillar is located midway of the length of travel of the motor, the hose being of sufficient length to allow for the travel of the table. This pillar effectively prevents the cable from dragging on the floor but, in a very long machine, there is required a correspondingly high pillar which presents a rather unsightly appearance and since it projects above the machine is liable to be in the way in bringing work to and from the machine.

It is therefore an object of my invention to overcome these difficulties by providing a trolley system on the base of the machine for conveying current from the source of supply to electrical devices on the reciprocating table and to substantially enclose said trolley system in a protective casing, thereby forming a neat and compact, as well as safe, arrangement of parts.

It is a further object of my invention to arrange the anchoring and insulating means for the conductors of the trolley system so as to bring them within the smallest possible compass longitudinally of the machine, and to provide means for readily adjusting the cooperating contacts of the trolley system.

With these and other objects in view, as will appear from the following disclosure, my invention resides in the combination of parts set forth in the specification and covered by the claims appended thereto.

Referring to the accompanying drawings:

Fig. 2 is a similar view of the parts shown in Fig. 1 but on an enlarged scale and having parts shown in section or broken away to more clearly show the structure;

Fig. 3 is a cross section taken substantially on the line 3—3 of Fig. 2 but showing the front channel iron of the trolley box in place; and Fig. 4 is a cross section through the insulator block on the collector arm taken on the line 4—4 of Fig. 2.

Figure 6:
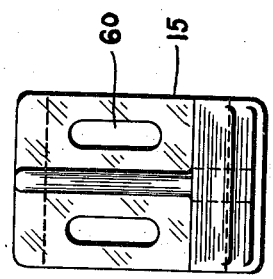
Fig. 6 is a detail view of a supporting bracket.

Referring to the drawings, I have there illustrated a grinding machine of the Norton type having my invention applied thereto. This type of grinding machine has the usual base 1 on which is mounted for reciprocation the work table 2 having a headstock 3 and tailstock 4. On the rear of the base is mounted the usual wheel head 5 carrying the grinding wheel 6. I have shown the headstock as being provided with an electric motor 7 for driving the work and it is supplied with current from a suitable source, not shown. It is with the means for conveying current to this motor, which allows it to be controlled from the operator's position in front of the machine, that my invention has to do.

Between the source of current supply and the motor I have provided a trolley system 8, the cooperating parts of this system being arranged, respectively, on the table and the base and comprising, in my preferred form, a collector arm 9 on the table and conductors or bus bars 10 on the base.

In the specific embodiment of my invention selected for illustration I have shown three conductors or bus bars 10, but it will of course be understood that the number could be varied to suit the type of motor used on the headstock. I have shown a structure adapted to use an alternating current and the motor 7 may be a three phase alternating current motor. With this type of motor, since it need not be over 5 horsepower even in the largest machine, I am enabled to take the current direct from the source of supply and control the motor by inserting in the connection a suitable switch such as the three-pole switch 11 shown in Fig. 1 arranged on the base of the machine. If necessary or desirable to use direct current and a motor operated thereby, it is of course obvious to one skilled in the art that a suitable starting resistance would be utilized as required without departing from the spirit of my invention.

Figure 1:
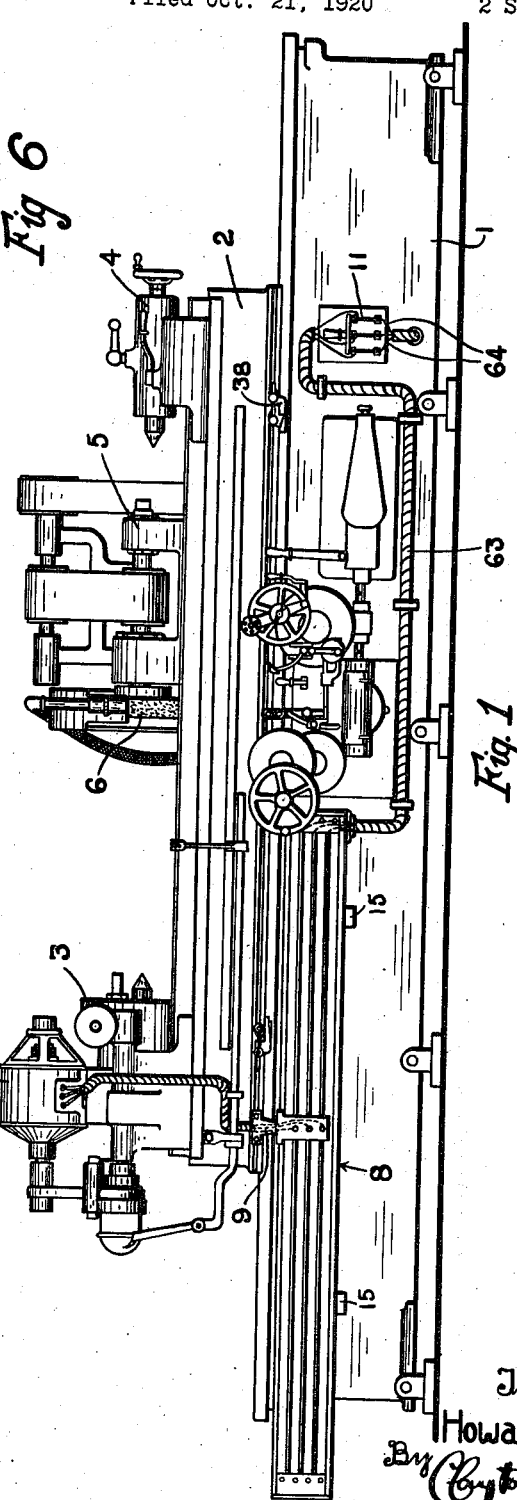
Figure 1 is a front elevation of a grinding machine showing one embodiment of my invention in place thereon, the front portion of the casing or box enclosing the conductors being removed to more clearly show the parts.

I preferably employ a protective casing or trolley box 12 for enclosing the conductors 10. For this purpose I utilize a very economical and readily assembled structure consisting of two opposed channel iron bars 13 and 14 of equal length supported on suitable brackets 15 attached to the front of the base of the machine. The bars are held in place on the brackets by suitable means, such as the cap screws 16. In order to provide a slot in the box for the collector arm 9 I utilize a forward channel iron bar 14 of greater height than the rear channel iron bar 13, the former having its top flange overhanging the top flange of the latter to prevent foreign matter falling into the casing. As shown, the tops of the bars 13 and 14 may slope away from the slot, so that dirt and water will run off the casing. Suitable closure plates 17 and 18 are provided at the ends of the box. The box is obviously made of sufficient length to allow for the longest stroke of the table, and if necessary to obtain the proper length, a number of bars may be arranged end to end until the desired length is obtained. In Fig. 1, I have shown the box extending from the apron carrying the major part of the control mechanism of the machine to and a short distance beyond the end of the machine base.

Figure 5:
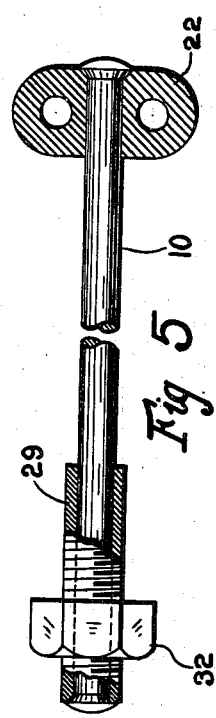
Fig. 5 is a detail view, showing means for anchoring a conductor.

The conductors 10 are suitably insulated from the box and to allow of a maximum stroke of the table with a minimum length of box, I have provided special insulating blocks in which the ends of the conductors are anchored, these blocks being suitably fastened as by screws to the back channel iron bar 13. The block 20 at the right-hand end of the box (Fig. 2) has a number of cut-out recesses 21 corresponding in number and to receive the ends of the conductors 10, which are preferably connected to the blocks by means of terminal plates 22 fitting into parts of the recesses 21 shaped to receive them and held therein by means of bolts 23. The ends of the conductors are connected to the terminal plates 22 in any suitable manner, such as that shown in Fig. 5. The conductor is passed through a hole in the terminal plate and then riveted and preferably soldered to the plate. One of each pair of bolts 23 for fastening the terminal plates 22 also serves as a binding post to connect the bared terminals of the insulated wires 24 leading from the conductors 10 toward the source of energy supply (not shown). These bolts are preferably provided with washers 25 between which and the terminal plates 22 the bared terminals of the wires are clamped. A conduit 26 is cut into the block 20 to receive the wires 24 which leave the box through an opening in the lower side thereof. That side of the block which has the recesses 21 and conduit 26 cut thereinto to receive the ends of the conductors and the wires 24 is covered, to insure proper insulation from the box, by a cap 27 of insulating material suitably connected thereto as by screws.

At the opposite end of the box the conductors 10 are anchored in an insulating block 28 in a manner to allow the collector arm to approach the anchoring block as closely as possible. These ends of the conductors are preferably connected as by riveting and soldering (Fig. 5) to short brass sleeves 29. These sleeves are screw threaded and pass into holes 30 drilled into the block, the left-hand ends of which are enlarged by a counterboard part 31 and the ends of the rods extend into the counterbore to receive washers and nuts 32 thereon, whereby the conductors can be placed under proper tension. The side of the block having the opening to receive the nuts 32 is prefrably covered by a cap 33 of insulating material, this cap having holes 34 formed therein but not extending entirely therethrough, these holes being aligned with the holes 30 in the block 28. The cap is fastened to the block by suitable means, such as screws 35.

The collector arm 9 is preferably adjustably connected to the table to allow of moving it therealong with the headstock which is, as is usual in this type of machine, adjustable along the table to adapt it to receive different lengths of work. I make use of the usual T-slot 37 for receiving the reversing dogs 38 (Figs. 1 and 2) and clamping them in position to connect the collector arm to the table as by means of bolts 39 having their heads in the T-slot. The upper end of this arm is substantially vertical but it is offset laterally where it enters the slot 40 in the box to allow the upper flange of the outer angle iron bar 14 to overhang the upper flange of the inner bar 13. The arm 9 proper extends into the box just a short distance and is there widened out to form two laterally extending lugs 41 for connecting an insulating block 42 thereto, this block serving to carry the contact shoes 43 which engage the conductors 10. This block has grooves 44 cut in its side (Fig. 4) to receive the bolts 45 for fastening it to the lugs 41 of the collector arm proper, the bolts being properly spaced at their lower ends by a plate 46 arranged between the heads of the bolts and the insulating blocks. The contact shoes 43 fit into slots 47 cut into the side of the insulating block facing the conductors 10 and are provided on the upper sides with grooves 50 to receive the conductors, whereby a good contact therewith is at all times secured, even if the conductors should sag. The shoes are held in place on the block by means of the headed screws 51 having their heads in countersunk recesses 52. On the same side of the block on which these recesses 52 are arranged I provide a longitudinally extending recess or channel 53, such channel terminating adjacent the bottom of the block and extending through to the top.

Studs 54 connected with the shoes 43 pass through holes in the block into this recess or channel 53, where they are provided with holes 55 and screws 56 for clamping the bared ends of the insulated wires 57 leading to the motor 7. From the block the wires pass upwardly through the hollow arm 9 to the motor. An insulating cap 58 is secured by screws 59 to the side of the block to cover the recesses 52 and 53.

In order to maintain the conductors 10 in firm contact with the shoes 43, I preferably arrange the shoes in such a position that their contacting grooves 50 are at a slightly higher level than the points of connection of the conductors. After the shoes become worn it may become necessary to adjust them relative to the wires so as always to maintain a firm contact and to effect this adjustment I may employ the supporting brackets 15 with slots 60 (Fig. 6) through which are passed the cap screws 61 connecting the brackets to the base. This construction allows a vertical adjustment of the entire box 12 and with it the conductors 10. I have also shown a construction whereby the insulating block 42 carrying the contact shoes 43 may be raised vertically after the shoes have become worn and to allow of this adjustment, I originally place a shim 62 of insulating material between the top of the block and the widened lower portion of the collector arm 9. The necessary adjustment is obtained after wear by removing this shim.

The wires passing out of the right-hand end of the box I have shown passing through a flexible protective hose pipe 63 (Fig. 1) suitably fastened at the front of the machine to the three-pole switch 11, the latter being connected to the line wires or other suitable source of supply (not shown) by wires 64 passing through the base to the rear of the machine.

From this construction, it will be seen that the operator can start and stop the motor by merely opening and closing the switch 11, the circuit from the line to the motor being completed through the trolley box in all positions of the headstock.

Having thus described my invention, what I claim as new and desire to secure by Letters Patent is:

1. A grinding machine comprising a base having ways, a table mounted for reciprocation thereon, a rotatable grinding wheel adapted to grind work mounted on said table, head and tail stocks on the table to support the work, an electric motor connected to rotate the work during grinding thereof, an electric conductor mounted on the base below the table and extending parallel with said ways, a collector arm on the table electrically contacting with said conductor as the table moves and electrical devices completing the circuit between said electric conductor, collector arm and motor.

2. A grinding machine comprising a base having ways, a rotatable grinding wheel on the base, a table reciprocably mounted on said ways, an electric motor on the table, a conductor spaced below the table in parallelism with said ways, supports and enclosing walls for the conductor on said machine, a collector arm depending from said table in sliding contact with said conductor, a controlling device for the motor on the machine and electrical connections between said conductor, collector arm and motor.

3. A grinding machine comprising a base, a rotatable grinding wheel, a table mounted for reciprocation on said base, an adjustable head stock mounted for movement lengthwise of said table, work-driving means including an electric motor mounted on said head stock, means for conveying current to said motor in all operative positions of the same comprising a collector arm mounted on said table and cooperating conductors on said base, and means for adjusting the position of said arm lengthwise of the table.

4. A grinding machine comprising a base, a table mounted for reciprocation thereon, a rotatable grinding wheel, a head stock adjustably mounted on the table to support the work, work driving means including an electric motor on said head stock and means for conveying current to said motor, comprising a collector arm mounted on and adjustable longitudinally of said table, conductors adjustably mounted on said base and contact devices on said collector arm in engagement with said conductors.

5. A machine tool comprising a base, a table movably mounted thereon, an electric device on said table, means for conveying current to said device in all operative positions of the same, comprising a trolley system including a collector arm on the table and a box carrying conductors cooperating with said arm, brackets connecting said conductors to the base, said connections being adjustable to vary the position of the conductors relative to the collector arm to compensate for wear.

6. A machine tool comprising a base, a table movably mounted thereon, an electric device on said table, means for conveying current to said device in all operative positions of the same, comprising a collector arm on said table and a plurality of cooperating conductors on said base, a box substantially enclosing said conductors, insulator blocks in said box adjacent the ends thereof, means for fixedly connecting said conductors at one end to one of said insulator blocks, and means for adjustably connecting the opposite ends of said conductors to the other insulator block whereby the tension of said conductors can be readily controlled.

7. A machine tool comprising a base, a table movably mounted thereon, an electric device on said table, means for conveying current to said device in all operative positions of the same, comprising a collector arm on said table and a plurality of cooperating conductors on said base, a box substantially enclosing said conductors, insulator blocks in said box adjacent the ends thereof, means for fixedly connecting said conductors at one end to one of said insulator blocks, and means for adjustably connecting the opposite ends of said conductors to the other insulating block comprising a screw-threaded sleeve connected to the end of the conductors and nuts cooperating with said sleeve.

Signed at Worcester, Massachusetts, this 20th day of October, 1920.

HOWARD W. DUNBAR.